United States Patent Office 3,103,524
Patented Sept. 10, 1963

3,103,524
$\Delta^{1,3,5(10),9(11)}$-ESTRATETRAENE-16β,17β-DIOLS AND 16α-LOWER HYDROCARBON DERIVATIVES THEREOF
Albert Bowers and Pierre Crabbé, Mexico City, Mexico, assignors, by mesne assignments, to Syntex Corporation, a corporation of Panama
No Drawing. Filed Mar. 1, 1962, Ser. No. 176,825
15 Claims. (Cl. 260—397.5)

The present invention relates to novel cyclopentanophenanthrene derivatives and to a process for the production thereof.

More particularly the present invention relates to novel $\Delta^{1,3,5(10),9(11)}$-estratetraene-16β,17β-diols and to novel 16α-lower hydrocarbon derivatives thereof.

The novel compounds of the present invention are represented by the following formula:

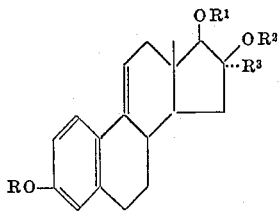

In the above formula R represents hydrogen, lower alkyl or a hydrocarbon carboxylic acyl group of less than 12 carbon atoms; $R^1$ and $R^2$ represent hydrogen or a hydrocarbon carboxylic acyl group of less than 12 carbon atoms and $R^3$ represents hydrogen, lower alkyl, lower alkenyl, or lower alkynyl.

The acyl groups are derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

The compounds represented by the above formula have low estrogenic activity but are very valuable in arresting calcium excretion in certain bone conditons and catabolic states, such as osteoporosis. In addition they lower the blood and adrenal cholesterol levels, are valuable in the treatment of arteriosclerosis.

The novel compounds of the present invention are prepared by the process exemplified as follows:

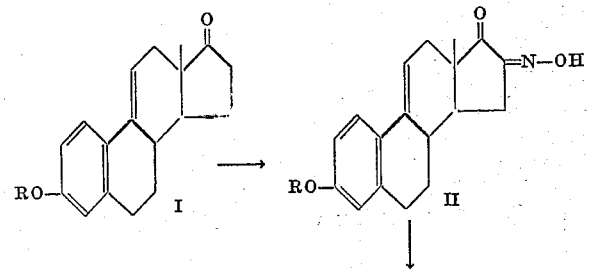

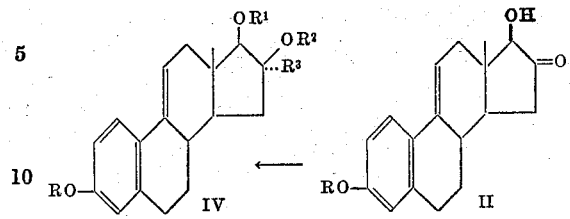

In the above formulas R, $R^1$, $R^2$ and $R^3$ have the same meaning as hereinbefore set forth.

In accordance with the above equation the starting compound (I) which is selected from the group consisting of $\Delta^{9(11)}$-dehydro estrone, the 3-lower alkyl ethers and the 3-acylates thereof, is treated with isoamyl nitrite in the presence of potassium t-butoxide for a period of time of the order of 6 hours at room temperature and thereafter with aqueous glycine and hydrochloric acid to produce the corresponding 16-oximino-$\Delta^{9(11)}$-dehydro estrone derivative (II). The latter 16-oximino compound upon reaction with zinc in aqueous acetic acid at reflux temperature for a period of time in the order of 1 hour, furnishes the corresponding $\Delta^{1,3,5(10),9(11)}$- estratetraen-17β-ol-16-one (III).

The 16-ketones (III) are treated with a lower alkyl, lower alkenyl or lower alkynyl magnesium halide as for example methyl magnesium bromide, vinyl magnesium bromide or ethynyl magnesium bromide in a solvent inert to the reagents, to produce the corresponding 16α (lower alkyl, lower alkenyl or lower alkynyl-$\Delta^{1,3,5(10),9(11)}$-estratetraene-16β,17β-diol derivatives (IV: $R^1=R^2=H$).

The 17β-hydroxy-16-ketones (III) are reduced, preferably with sodium borohydride, in order to produce the corresponding 16β,17β-diols (IV: $R^1=R^2=R^3=H$).

The secondary hydroxyls of the compounds set forth hereinbefore, such as the 17β-hydroxyl group and/or the 16β-hydroxyl group of the 16α-unsubstituted compounds, are conventionally acylated in pyridine with an acylating agent, as for example acetic anhydride or propionic anhydride, to give the corresponding 17β and/or 16β-acylates (IV: $R^3=H$, $R'=R^2=$acyl). In the case of the 16α-substituted compounds, this type of conventional esterification affords selectively the 17β-acylates (IV: $R^1=$acyl, $R^2=$hydrogen, $R^3=$lower hydrocarbon).

The 16β-tertiary hydroxyl group of the 16α-substituted derivatives (IV: $R^2=H$, $R^3=$lower hydrocarbon) is conventionally acylated in the presence of p-toluenesulfonic acid with an acylating agent such as an anhydride derived from a hydrocarbon carboxylic acid of the type described hereinbefore, to give the corresponding 16β-acylate (IV: $R^2=$acyl, $R^3=$lower hydrocarbon).

The following specific examples serve to illustrate but are not intended to limit the scope of the invention:

*Example I*

To a solution of 1 g. of potassium in 75 cc. of t-butanol there were added 2.5 g. of $\Delta^{9(11)}$-dehydroestrone-3-methyl-ether (Magerlein et al., J. Am. Chem. Soc. 80, 2220, [1958]). The resulting mixture was gently warmed until solution of the steroid was complete, then it was allowed to cool to room temperature. There were added 1.8 cc. of isoamylnitrite with stirring, which was thereafter continued for 6 hours. The reaction mixture was allowed to stand at room temperature overnight. Then there were added 500 cc. of aqueous glycine followed by 7 cc. of concentrated hydrochloric acid. The mixture was extracted with 500 cc. of ether. The organic layer was washed once with 300 cc. of 3% aqueous sodium bicarbonate solution and then extracted with 500 cc. of 5% aqueous potassium hydroxide solution. Acidification of the basic aqueous phase with concentrated hydrochloric acid yielded a precipitate which upon recrystallization from methanol afforded pure 16-oximino-$\Delta^{9(11)}$-dehydroestrone-3-methylether.

Example II 2.5 g. of the latter product were mixed with 2.5 g. of zinc dust and 125 cc. of 50% aqueous acetic acid and refluxed for 1 hour at the end of which the mixture was filtered through celite. The filtrate was concentrated to a small volume under reduced pressure, cooled and diluted with ice water to precipitate a crude product. Recrystallization from acetone-hexane afforded 3-methoxy-$\Delta^{1,3,5,(10),9(11)}$-estratetraen-17β-ol-16-one.

Example III

A solution of 5 g. of the final compound of Example II, in 250 cc. of thiophene-free benzene was treated with 27.5 cc. of 4 N methylmagnesium bromide in ether and the mixture refluxed with the exclusion of moisture for 3 hours. The cooled mixture was cautiously treated with excess aqueous ammonium chloride solution and the product isolated by ethyl acetate extraction. The extract was washed with water, dried over anhydrous sodium sulfate and evaporated to dryness.

Recrystallization from methylene chloride-hexane afforded 3-methoxy-16α-methyl-$\Delta^{1,3,5(10),9(11)}$-estratetraene-16β,17β-diol.

Example IV 3-methoxy-$\Delta^{1,3,5(10),9(11)}$-estratetraen-17β-ol-16-one was treated in accordance with Example III except that methyl magnesium bromide was substituted by vinyl magnesium bromide thus yielding 3-methoxy-16α-vinyl-$\Delta^{1,3,5(10),9(11)}$-estratetraene-16β,17β-diol.

Example V 3-methoxy-$\Delta^{1,3,5(10),9(11)}$-estratetraen-17β-ol-16-one was treated in accordance with Example III, with the exception that ethinyl magnesium bromide was used instead of methyl magnesium bromide, thus giving 3-methoxy-16α-ethinyl-$\Delta^{1,3,5(10),9(11)}$-estratetraene-16β,17β-diol.

Example VI $\Delta^{9(11)}$-estrone (Magerlein et al., v. supra) was treated in accordance with Examples I, II and III, giving successively: 16-oximino-$\Delta^{9(11)}$-estrone, $\Delta^{1,3,5(10),9(11)}$-estratetraene-3,17β-diol-16-one and 16α-methyl-$\Delta^{1,3,5(10),9(11)}$-estratetraene-3,16β,17β-triol.

Example VII $\Delta^{1,3,5(10),9(11)}$-estratetraen-17β-ol-16-one was treated following the procedure of Example IV, thus yielding 16α-vinyl-$\Delta^{1,3,5(10),9(11)}$-estratetraene-3-16β,17β-triol.

Example VIII $\Delta^{1,3,5(10),9(11)}$-estratetraen-17β-ol-16-one was treated in accordance with Example V, thus yielding 16α-ethinyl-$\Delta^{1,3,5(10),9(11)}$-estratetraene-3,16β,17β-triol.

Example IX

A solution of 1 g. of sodium borohydride in 3 cc. of water was added to an ice-cooled solution of 1 g. of 3-methoxy-$\Delta^{1,3,5(10),9(11)}$-estratetraene-17β-ol-16-one, in 120 cc. of methanol and the mixture was allowed to stand for 16 hours at room temperature. The excess reagent was decomposed by addition of acetic acid, the solution concentrated to small volume in vacuo and diluted with water. The product was extracted with ethyl acetate, the extract was washed with water, dried and evaporated. The solid residue was purified by crystallization from acetone-hexane to give 3-methoxy-$\Delta^{1,3,5(10),9(11)}$-estratetraene-16β,17β-diol.

By the same technique was treated $\Delta^{1,3,5(10),9(11)}$-estratetraene-3,17β-diol-16-one, thus giving $\Delta^{1,3,5(10),9(11)}$-estratetraene-3,16β,17β-triol.

Example X

A mixture of 1 g. of 3-methoxy-$\Delta^{1,3,5(10),9(11)}$-estratetraene-16β,17β-diol, 4 cc. of pyridine and 2 cc. of acetic anhydride was kept at room temperature overnight, poured into ice water, the formed precipitate was filtered, washed with water and dried. Crystallization from acetone-hexane gave the diacetate of 3-methoxy-$\Delta^{1,3,5(10),9(11)}$-estratetraene-16β,17β-diol.

In the same manner were treated the starting compounds under I, thus yielding the corresponding products under II.

| I | II |
|---|---|
| 3-methoxy-16α-methyl-$\Delta^{1,3,5(10),9(11)}$-estratetraene-16β,17β-diol. | 17-acetate of 3-methoxy-16α-methyl-$\Delta^{1,3,5(10),9(11)}$-estratetraene-16β,17β-diol. |
| 3-methoxy-16α-vinyl-$\Delta^{1,3,5(10),9(11)}$-estratetraene-16β,17β-diol. | 17-acetate of 3-methoxy-16α-vinyl-$\Delta^{1,3,5(10),9(11)}$-estratetraene-16β,17β-diol. |
| 3-methoxy-16α-ethinyl-$\Delta^{1,3,5(10),9(11)}$-estratetraene-16β,17β-diol. | 17-acetate of 3-methoxy-16α-ethinyl-$\Delta^{1,3,5(10),9(11)}$-estratetraene-16β,17β-diol. |
| 16α-methyl-$\Delta^{1,3,5(10),9(11)}$-estratetraene-3,16β,17β-triol. | 3,17-diacetate of 16α-methyl-$\Delta^{1,3,5(10),9(11)}$-estratetraene-3,16β,17β-triol. |
| 16α-vinyl-$\Delta^{1,3,5(10),9(11)}$-estratetraene-3,16β,17β-triol. | 3,17-diacetate of 16α-vinyl-$\Delta^{1,3,5(10),9(11)}$-estratetraene-3,16β,17β-triol. |
| 16α-ethinyl-$\Delta^{1,3,5(10),9(11)}$-estratetraene-3,16β,17β-triol. | 3,17-diacetate of 16α-ethinyl-$\Delta^{1,3,5(10),9(11)}$-estratetraene-3,16β,17β-triol. |
| $\Delta^{1,3,5(10),9(11)}$-estratetraene-3,16β,17β-triol. | triacetate of $\Delta^{1,3,5(10),9(11)}$-estratetraene-3,16β,17β-triol. |

Example XI

Upon treatment of the starting compounds of the foregoing example by the procedure described in that example, but using instead of acetic anhydride, propionic anhydride, caproic anhydride and cyclopentylpropionic anhydride, there were produced the corresponding propionates caproates and cyclopentylpropionates of said starting compounds.

Example XII

To a solution of 5 g. of 3-methoxy-16α-methyl-$\Delta^{1,3,5(10),9(11)}$-estratetraene-16β,17β-diol in 100 cc. of anhydrous benzene there were added 1 g. of p-toluenesulfonic acid and 10 cc. of propionic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced the dipropionate of 3-methoxy-16α-methyl-$\Delta^{1,3,5(10),9(11)}$-estratetraene-16β,17β-diol.

By the same procedure were treated the starting compounds under A affording the corresponding products under B.

| A | B |
|---|---|
| 3-methoxy-16α-vinyl-Δ$^{1,3,5(10),9(11)}$-estratetraene-16β,17β-diol. | The dipropionate of 3-methoxy-16α-vinyl-Δ$^{1,3,5(10),9(11)}$-estratetraene-16β,17β-diol. |
| 3-methoxy-16α-ethinyl-Δ$^{1,3,5(10),9(11)}$-estratetraene-16β,17β-diol. | The dipropionate of 3-methoxy-16α-ethinyl-Δ$^{1,3,5(10),9(11)}$-estratetraene-16β,17β-diol. |
| 16α-methyl-Δ$^{1,3,5(10),9(11)}$-estratetraene-3,16β,17β-triol. | The tripropionate of 16α-methyl-Δ$^{1,3,5(10),9(11)}$-estratetraene-3,16β,17β-triol. |
| 16α-vinyl-Δ$^{1,3,5(10),9(11)}$-estratetraene-3,16β,17β-triol. | The tripropionate of 16α-vinyl-Δ$^{1,3,5(10),9(11)}$-estratetraene-3,16β,17β-triol. |
| 16α-ethinyl-Δ$^{1,3,5(10),9(11)}$-estratetraene-3,16β,17β-triol. | The tripropionate of 16α-ethinyl-Δ$^{1,3,5(10),9(11)}$-estratetraene-3,16β,17β-triol. |

*Example XIII*

The starting compounds of the foregoing example were treated by the procedure disclosed in that example, except that propionic anhydride was substituted by acetic anhydride and caproic anhydride, thus affording respectively the corresponding acetates and caproates.

*Example XIV*

The 17-acetate of 3-methoxy-16α-methyl-Δ$^{1,3,5(10),9(11)}$-estratetraene-16β,17β-diol was treated following the technique described in Example XII, thus yielding the 16-propionate-17-acetate of 3-methoxy-16α-methyl-Δ$^{1,3,5(10),9(11)}$-estratetraene-16β,17β-diol.

We claim:
1. A compound of the following formula:

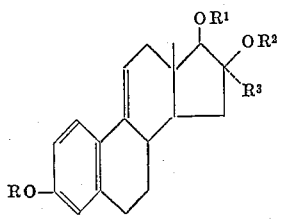

wherein R is selected from the group consisting of hydrogen, lower alkyl and a hydrocarbon carboxylic acyl group of less than 12 carbon atoms; $R^1$ and $R^2$ are members of the group consisting of hydrogen and a hydrocarbon carboxylic acyl group of less than 12 carbon atoms and $R^3$ is selected from the group consisting of hydrogen, lower alkyl, lower alkenyl and lower alkynyl.

2. 3-methoxy 16α-methyl-Δ$^{1,3,5(10),9(11)}$-estratetraene-16β,17β-diol.
3. 3-methoxy-16α-vinyl-Δ$^{1,3,5(10),9(11)}$-estratetraene-16β,17β-diol.
4. 3-methoxy-16α-ethynyl-Δ$^{1,3,5(10),9(11)}$-estratetraene-16β,17β-diol.
5. 3-methoxy-Δ$^{1,3,5(10),9(11)}$-estratetraene-16β,17β-diol.
6. 16α-methyl-Δ$^{1,3,5(10),9(11)}$-estratetraene-3,16β,17β-triol.
7. 16α-vinyl-Δ$^{1,3,5(10),9(11)}$-estratetraene-3,16β,17β-triol.
8. 16α-ethynyl-Δ$^{1,3,5(10),9(11)}$-estratetraene-3,16β,17β-triol.
9. Δ$^{1,3,5(10),9(11)}$-estratetraene-3,16β,17β-triol.
10. The 3,17-diacetate of 16α-methyl-Δ$^{1,3,5(10),9(11)}$-estratetraene-3,16β,17β-triol.
11. The 3,17-diacetate of 16α-vinyl-Δ$^{1,3,5(10),9(11)}$-estratetraene-3,16β,17β-triol.
12. The 3,17-diacetate of 16α-ethynyl-Δ$^{1,3,5(10),9(11)}$-estratetraene-3,16β,17β-triol.
13. The triacetate of 16α-methyl-Δ$^{1,3,5(10),9(11)}$-estratetraene-3,16β,17β-triol.
14. The triacetate of 16α-vinyl-Δ$^{1,3,5(10),9(11)}$-estratetraene-3,16β,17β-triol.
15. The triacetate of 16α-ethynyl-Δ$^{1,3,5(10),9(11)}$-estratetraene-3,16β,17β-triol.

References Cited in the file of this patent

Fishman et al., "Jour. Org. Chem.," vol. 23, 1958, pages 1190–92.